UNITED STATES PATENT OFFICE.

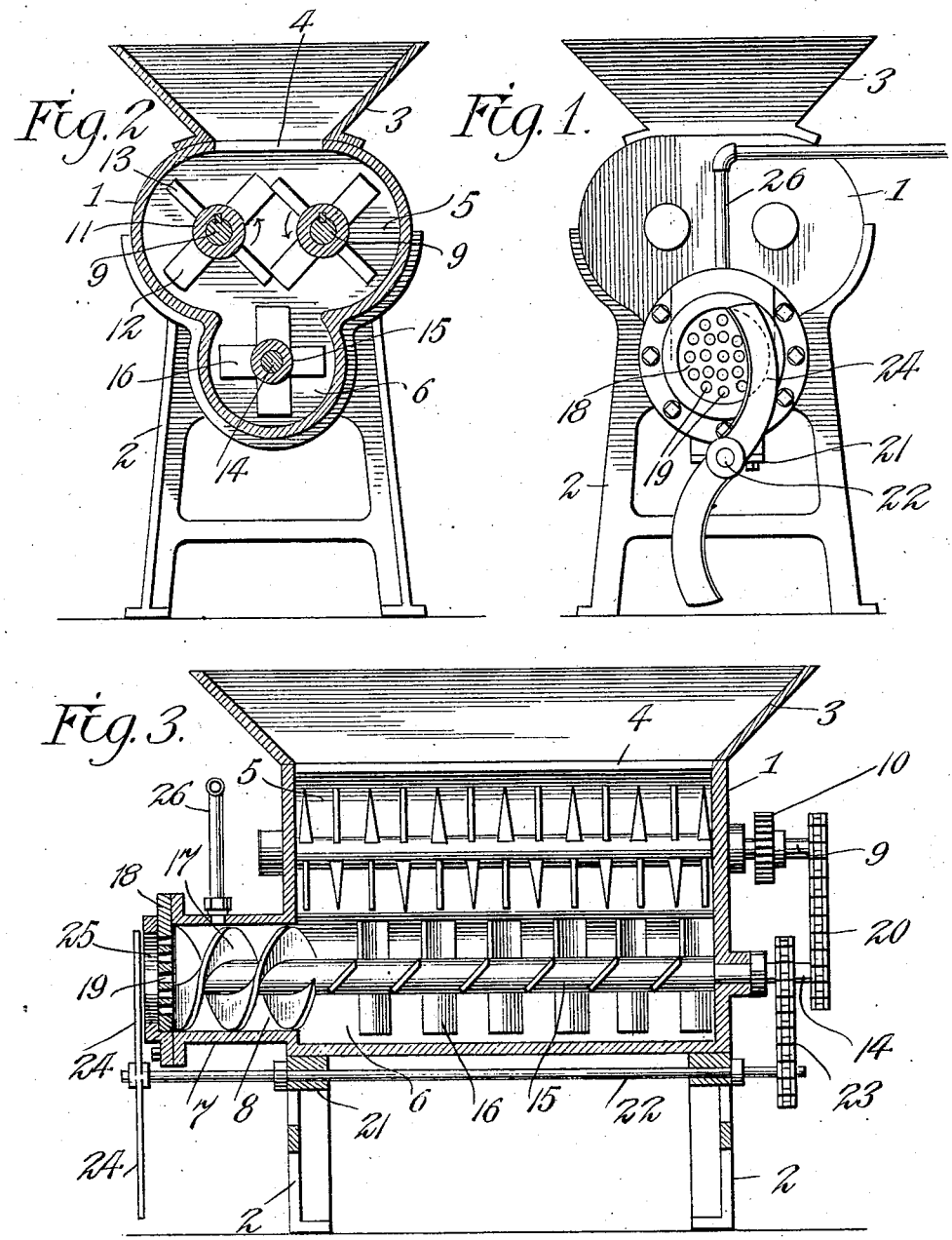

DAVID E. BANGS, OF MEDFORD, MASSACHUSETTS.

BRIQUET-MACHINE.

No. 855,379.　　　　Specification of Letters Patent.　　　　Patented May 28, 1907.

Application filed October 27, 1906. Serial No. 340,876.

*To all whom it may concern:*

Be it known that I, DAVID E. BANGS, a citizen of the United States, residing at Medford, in the county of Middlesex and State of Massachusetts, have invented new and useful Improvements in Briquet-Machines, of which the following is a specification.

This invention relates to briquet machines, designed especially for preparing peat to be used as fuel, and has for its objects to produce a comparatively simple, inexpensive device of this character wherein the material will be effectually disintegrated and pulverized and thereafter mixed and fed through a suitable mold plate by which it is properly shaped.

A further object of the invention is to provide a device of this nature wherein the operations of pulverizing and mixing the peat will be rapidly performed, one in which the material will be fed in a thoroughly moist state through the mold plate, and one wherein the material as it issues from the mold will be severed into sections of predetermined length.

With these and other objects in view, the invention comprises the novel features of construction and combination of parts more fully hereinafter described.

In the accompanying drawings: Figure 1 is a front end elevation of a machine embodying the invention. Fig. 2 is a vertical, transverse section through the machine. Fig. 3 is a vertical section taken centrally and longitudinally through the machine.

Referring to the drawings, it will be seen that the machine embodies a box or casing 1 sustained upon supporting legs 2, there being mounted on the casing a feed hopper 3 having communication with the interior of the casing through the medium of a feed opening or mouth 4, while formed in the interior of the casing is an upper separating chamber 5 and a lower mixing or pugging chamber 6, at the forward end of which the casing has a cylindrical, tubular extension 7 forming a feed compartment or chamber 8 constituting in effect a continuation of the chamber 6.

Extended longitudinally through the casing within the disintegrating chamber 5 is a pair of parallel shafts 9 connected at their rear ends, which project beyond the casing through the medium of intermeshing gears 10 arranged to drive the shafts in relatively reverse directions, one from the other, there being fixed upon each of the shafts a tubular sleeve 11 to which is fixed a series of radially projecting cutting blades 12 and sharpened spike teeth 13 disposed in alternate relation and in rows throughout the lengths of the shafts.

Extended longitudinally through the mixing chamber 6 within the casing and on a line centrally between the shafts 9 is a rotary feed shaft 14 having fixed thereon a tubular sleeve 15 equipped with a plurality of rows of radiating mixing knives or blades 16 pitched at a diagonal, transverse inclination, as shown, for feeding the material toward the forward end of the shaft, on which there is provided, within the compartment 8, a double spiral feed screw 17, there being attached to the forward end of the extension 7 a molding or die plate 18 having a series of die openings 19 through which the material is pressed under the action of the screw 17, while arranged on the rear end of the shaft 14, which projects beyond the casing, is a chain belt 20 through the medium of which said shaft is operatively connected with one of the shafts 9.

Journaled in bearings 21 beneath the casing, is a longitudinally extending, rotary cutter shaft 22 connected at its rear end by means of a chain belt 23 with the shaft 14 and carrying at its forward end a double knife, the reversely curved blades 24 of which sweep successively over the mouth 25 of the extension 7 and at the outer side of the mold plate 18, while leading through the wall of the casing 7 and into the compartment 8 above the screw 17 is an exhaust steam supply pipe or duct 26 through which exhaust steam from the boiler is fed into the compartment for moistening the material therein.

In practice, and during operation of the machine, the shafts 9 will be driven in relatively reverse directions, as indicated by the arrow in Fig. 2, whereby the material which is fed into the casing through the hopper 3 and mouth 4 will, in passing downward between the shafts, be thoroughly disintegrated and chopped under the action of the blades 12 and teeth 13, as they pass in reverse directions through the material. The pulverized material descends between the shafts 9 into the underlying chamber 6, whereupon it will be acted on and thoroughly mixed by the blades 16 and gradually fed forward to the compartment 8 to be finally caught by the screw 17 and forced under the action of the latter outward through the openings 19, in passing through which it is pressed into shape, it being noted that prior to being pressed outward by the screw the material is thoroughly moistened by the exhaust steam entering the compartment 8 through the pipe 26. The material issuing from the machine through the die plate is cut into appropriate lengths by means of the blades 24, it being noted in this connection that the speed of rotation of the shaft 22 may, in practice, be so timed as to vary the lengths of the sections cut by the blades.

Having thus described my invention, what I claim is:

1. A machine of the type described comprising a casing having an upper, disintegrating chamber and a lower mixing chamber, a pair of rotary shafts arranged side by side in the upper chamber and provided with alternately disposed disintegrating teeth and cutting blades, a feed shaft arranged in the lower chamber centrally beneath the first named shafts and equipped with mixing blades pitched to feed the material forwardly, said feed shaft being further provided with a spiral feed screw, a perforated die plate arranged at the forward end of the feed screw, and a cutting knife arrranged to sweep over the outer face of the die plate.

2. In a machine of the class described, a casing containing an upper, disintegrating chamber and a lower mixing chamber, a pair of rotary shafts arranged side by side in the upper chamber and provided with alternately disposed, disintegrating teeth and cutting blades, a feed shaft arranged in the lower chamber on a line centrally beneath the first named shafts and equipped with inclined blades adapted to mix the material and feed the same forwardly in the chamber, the casing being provided with an extension disposed at the forward end of the mixing chamber and constituting a feed compartment, a screw provided on the feed shaft within said compartment, a perforated die plate mounted at the forward end of the compartment and through which the material is forced under the action of the screw, and a cutting blade arranged to sweep over the mouth of the extension at the outer face of the die plate.

In testimony whereof, I affix my signature in presence of two witnesses.

DAVID E. BANGS.

Witnesses:
ALBERT E. SANFORD,
CORNELIUS BUCKLEY.